United States Patent
Narayanan et al.

(10) Patent No.: US 10,405,274 B2
(45) Date of Patent: Sep. 3, 2019

(54) COORDINATED TECHNIQUES TO IMPROVE APPLICATION, NETWORK AND DEVICE RESOURCE UTILIZATION OF A DATA STREAM

(71) Applicant: Nokia Solutions and Networks Oy, Espoo (FI)

(72) Inventors: Ram Lakshmi Narayanan, Pleasanton, CA (US); Swaminathan Arunachalam, Plano, TX (US)

(73) Assignee: Nokia Solutions and Networks Oy, Espoo (FI)

( * ) Notice: Subject to any disclaimer, the term of this patent is extended or adjusted under 35 U.S.C. 154(b) by 40 days.

(21) Appl. No.: 15/553,694

(22) PCT Filed: Feb. 26, 2015

(86) PCT No.: PCT/US2015/017672
§ 371 (c)(1),
(2) Date: Aug. 25, 2017

(87) PCT Pub. No.: WO2016/137463
PCT Pub. Date: Sep. 1, 2016

(65) Prior Publication Data
US 2018/0041958 A1    Feb. 8, 2018

(51) Int. Cl.
*H04W 52/02* (2009.01)
*H04L 29/08* (2006.01)
(Continued)

(52) U.S. Cl.
CPC ..... *H04W 52/0216* (2013.01); *H04L 65/4084* (2013.01); *H04L 65/602* (2013.01);
(Continued)

(58) Field of Classification Search
CPC ................................................ H04W 52/0216
See application file for complete search history.

(56) References Cited

U.S. PATENT DOCUMENTS

| | | | |
|---|---|---|---|
| 2009/0017860 A1* | 1/2009 | Cole | H04W 52/0261 455/522 |
| 2009/0098914 A1 | 4/2009 | Martin-Cocher et al. | 455/572 |

(Continued)

FOREIGN PATENT DOCUMENTS

| | | |
|---|---|---|
| WO | WO 2009/009166 A1 | 1/2009 |
| WO | WO 2014/037487 A1 | 3/2014 |

OTHER PUBLICATIONS

Open Mobile Alliance, OMA-TS-DPE-V1_0-20110705-A, "Device Profile Evolution Technical Specification", approved version 1.0—Jul. 5, 2011, © 2011 Open Mobile Alliance Ltd., 63 pgs.
(Continued)

*Primary Examiner* — Jason E Mattis
(74) *Attorney, Agent, or Firm* — Harrington & Smith

(57) ABSTRACT

Information is determined affecting data presentation of part of a data stream to a user application on a UE, and may be EC information and/or QoE information caused at least by the data presentation. The information is sent from the UE toward a content server from which the data stream is received by the UE. At radio network element(s), radio timer information corresponding to data transmission of part of the data stream from a base station to a UE is determined and sent (e.g., possibly with the energy consumption information and/or QoE information) to other radio network elements and/or to the content server. The content server can adjust streaming strategy of the data stream based on the information received, and the radio network element(s) can perform power aware scheduling and/or radio timer adjustments based on received EC information and/or the QoE information.

16 Claims, 10 Drawing Sheets

(51) Int. Cl.
*H04L 29/06* (2006.01)
*H04W 76/28* (2018.01)
*G06F 1/3212* (2019.01)

(52) U.S. Cl.
CPC .............. *H04L 65/80* (2013.01); *H04L 67/04* (2013.01); *H04W 52/0261* (2013.01); *H04W 76/28* (2018.02); *G06F 1/3212* (2013.01); *Y02D 10/174* (2018.01); *Y02D 30/40* (2018.01); *Y02D 70/1262* (2018.01); *Y02D 70/1264* (2018.01); *Y02D 70/24* (2018.01); *Y02D 70/25* (2018.01); *Y02D 70/26* (2018.01)

(56) References Cited

U.S. PATENT DOCUMENTS

| | | | | |
|---|---|---|---|---|
| 2012/0117225 | A1* | 5/2012 | Kordasiewicz | H04L 65/1083 709/224 |
| 2012/0179788 | A1* | 7/2012 | McGowan | H04N 21/44222 709/219 |
| 2013/0326551 | A1* | 12/2013 | Chatterjee | H04W 24/10 725/9 |
| 2015/0169696 | A1* | 6/2015 | Krishnappa | G06F 3/04842 707/722 |

OTHER PUBLICATIONS

Ghobadi, M., et al., "Trickle: Rate Limited YouTube Video Streaming", USENIX 2012 Annual Technical Conference, 6 pgs.

Jain, A., et al., "Mobile Throughput Guidance Signaling Protocol draft-flinck-mobile-throughput-guidance-00.txt", Oct. 2014, 20 pgs.

Open Mobile Alliance, OMA-AD-DPE-V1_0-20110705-A, "Device Profile Evolution Architecture", approved version 1.0—Jul. 5, 2011, © 2011 Open Mobile Alliance Ltd., 22 pgs.

Dialogic Making Innovation Thrive™, White Paper, "Quality of Experience for Mobile Video Users", © 2009 Dialogic Corporation, 12 pgs.

* cited by examiner

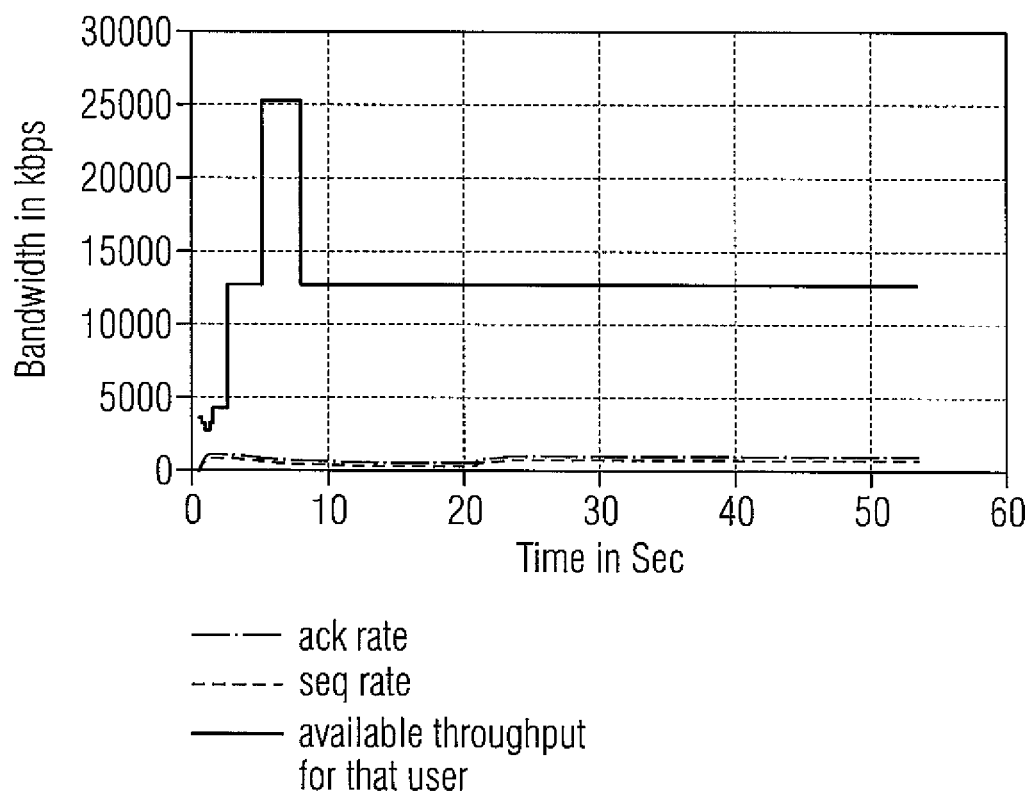

FIG 7

| No. | Time | Source | Destination | Protocol | Lenght | Info |
|---|---|---|---|---|---|---|
| 3092 | 37.170319 | 204.245.34.203 | 10.47.57.16 | HTTP | 530 | HTTP/1.1 200 OK (JPEG JFIF image) |
| 4149 | 56.040743 | 10.47.57.16 | 204.245.34.138 | HTTP | 612 | POST /qos/playback?cb=1329342584054_0 HTTP/1.1 (application/x-www-from-ur lencoded) |
| 4160 | 56.279683 | 204.245.34.138 | 10.47.57.16 | HTTP | 375 | HTTP/1.1 200 OK |
| 4191 | 56.899366 | 10.47.57.16 | 204.245.34.138 | HTTP | 826 | POST /qos/playback?cb=1329342585044_22 HTTP/1.1 (application/x-www-from-ur lencoded) |
| 4246 | 57.336241 | 204.245.34.138 | 10.47.57.16 | HTTP | 375 | HTTP/1.1 200 OK |
| 19299 | 311.274528 | 10.47.57.16 | 204.245.34.138 | HTTP | 1122 | POST /qos/playback?cb=1329342834715_624 HTTP/1.1 (application/x-www-from-ur lencoded) |
| 19595 | 316.243707 | 204.245.34.138 | 10.47.57.16 | HTTP | 375 | HTTP/1.1 200 OK |
| 29750 | 492.923422 | 10.47.57.16 | 204.245.34.138 | HTTP | 1168 | POST /qos/playback?cb=1329343021218_8 HTTP/1.1 (application/x-www-from-ur lencoded) |
| 30071 | 497.910849 | 204.245.34.138 | 10.47.57.16 | HTTP | 375 | HTTP/1.1 200 OK |

710

720 Energy consumption information

700

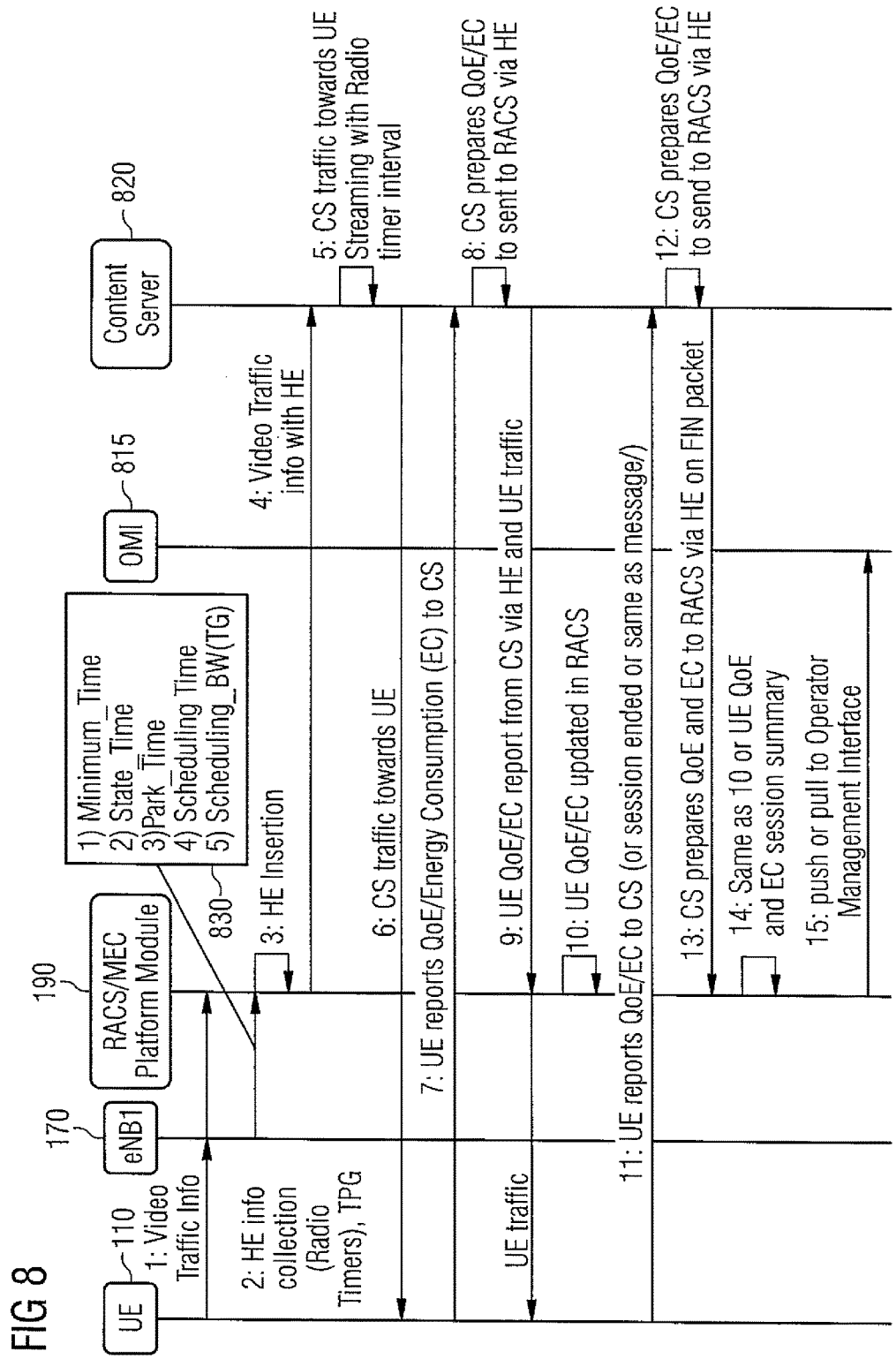

COORDINATED TECHNIQUES TO IMPROVE APPLICATION, NETWORK AND DEVICE RESOURCE UTILIZATION OF A DATA STREAM

TECHNICAL FIELD

This invention relates generally to wireless communications and, more specifically, relates to data communications over wireless networks.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section. Abbreviations that may be found in the specification and/or the drawing figures are defined below, prior to the claims.

Application service providers (ASPs) provide services to users over networks, such as mobile networks, the Internet, wide-area networks, and the like. The services include searching, video playback, mapping services, and the like. The ASPs and the network providers are engaged in joint partner projects to improve performance of networks, application services, and user satisfaction in mobile networks. It has been widely acknowledged that application usage from certain ASPs account for more than 50 percent of Internet traffic. For instance, Google services such as YouTube, hangout, search, maps are widely used by users. Among these services, Google's YouTube video streaming application alone contributes 95% of Google traffic. Similarly, Netflix uses a large percentage of Internet traffic. Even though traffic volume is high, user experience of these services may be not satisfactory. For instance, frequent video stall while watching a video, buffer under-run, and the like are common reported problems by users in wireless networks. The root cause is that, in wireless networks, bandwidth and latency do not remain constant with time, user location, and network load. Therefore, delivering video sessions, in particular, over a time-varying channel is a challenge. Users often blame the operator of the wireless network for such behavior, but operators often do not have a way to influence a change in network conditions to improve operation of a user's applications.

Network operators and ASPs are working together to have several solutions wherein their ASP services can be improved by combining information from various network sources. See, e.g., Jain, A., et al., "Mobile Throughput Guidance Signaling Protocol," IETF draft, draft-flinck-mobile-throughput-guidance-00.txt, Oct. 2014. Based on experiments and traces from live operator traffic, the inventors have realized that additional information about the radio network apart from throughput guidance, load, and congestion are required to improve services such as video streaming services.

BRIEF SUMMARY

This section is intended to include examples and is not intended to be limiting.

An example method comprises: at a user equipment, determining information affecting data presentation of part of a data stream to a user application on the user equipment, the information comprising energy consumption information caused at least by the data presentation of the part of the data stream to the user application on the user equipment; and sending the information from the user equipment toward a content server from which the data stream for the data presentation is received by the user equipment.

An additional example of an embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer.

An example apparatus comprises: means, at a user equipment, for determining information affecting data presentation of part of a data stream to a user application on the user equipment, the information comprising energy consumption information caused at least by the data presentation of the part of the data stream to the user application on the user equipment; and means for sending the information from the user equipment toward a content server from which the data stream for the data presentation is received by the user equipment.

An example of an apparatus includes one or more processors and one or more memories including computer program code. The one or more memories and the computer program code are configured to, with the one or more processors, cause the apparatus to perform at least the following: at a user equipment, determining information affecting data presentation of part of a data stream to a user application on the user equipment, the information comprising energy consumption information caused at least by the data presentation of the part of the data stream to the user application on the user equipment; and sending the information from the user equipment toward a content server from which the data stream for the data presentation is received by the user equipment.

An example of a computer program product includes a computer-readable storage medium bearing computer program code embodied therein for use with a computer. The computer program code includes: code for, at a user equipment, determining information affecting data presentation of part of a data stream to a user application on the user equipment, the information comprising energy consumption information caused at least by the data presentation of the part of the data stream to the user application on the user equipment; and code for sending the information from the user equipment toward a content server from which the data stream for the data presentation is received by the user equipment.

Another example method comprises: determining radio timer information corresponding to data transmission of part of a data stream from a base station to a user equipment; and sending the radio timer information toward a content server serving and adapting the data stream for data transmission by the base station to the user equipment.

An additional example of an embodiment comprises a computer program, comprising code for performing the method of the previous paragraph, when the computer program is run on a processor. The computer program according to this paragraph, wherein the computer program is a computer program product comprising a computer-readable medium bearing computer program code embodied therein for use with a computer.

An additional example apparatus comprises: determining radio timer information corresponding to data transmission of part of a data stream from a base station to a user equipment; and sending the radio timer information toward a content server serving and adapting the data stream for data transmission by the base station to the user equipment.

An example of an apparatus includes one or more processors and one or more memories including computer program code. The one or more memories and the computer program code are configured to, with the one or more processors, cause the apparatus to perform at least the following: determining radio timer information corresponding to data transmission of part of a data stream from a base station to a user equipment; and sending the radio timer information toward a content server serving and adapting the data stream for data transmission by the base station to the user equipment.

An example computer program product includes a computer-readable storage medium bearing computer program code embodied therein for use with a computer. The computer program code includes: code for determining radio timer information corresponding to data transmission of part of a data stream from a base station to a user equipment; and code for sending the radio timer information toward a content server serving and adapting the data stream for data transmission by the base station to the user equipment.

A further example method comprises: receiving, at a radio network element, radio timer information corresponding to data transmission of part of a data stream from a base station to a user equipment; inserting the radio timer information into data traffic information to be sent from the radio network element to a content server serving and adapting the data stream, wherein the data traffic information corresponds to and is in response to reception of the data stream; and sending the data traffic information including the inserted radio timer information from the radio network element to the content server.

An additional example of an embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer.

An example apparatus comprises: means for receiving, at a radio network element, radio timer information corresponding to data transmission of part of a data stream from a base station to a user equipment; means for inserting the radio timer information into data traffic information to be sent from the radio network element to a content server serving and adapting the data stream, wherein the data traffic information corresponds to and is in response to reception of the data stream; and means for sending the data traffic information including the inserted radio timer information from the radio network element to the content server.

An example of an apparatus includes one or more processors and one or more memories including computer program code. The one or more memories and the computer program code are configured to, with the one or more processors, cause the apparatus to perform at least the following: receiving, at a radio network element, radio timer information corresponding to data transmission of part of a data stream from a base station to a user equipment; inserting the radio timer information into data traffic information to be sent from the radio network element to a content server serving and adapting the data stream, wherein the data traffic information corresponds to and is in response to reception of the data stream; and sending the data traffic information including the inserted radio timer information from the radio network element to the content server.

An example of a computer program product includes a computer-readable storage medium bearing computer program code embodied therein for use with a computer. The computer program code includes: code for receiving, at a radio network element, radio timer information corresponding to data transmission of part of a data stream from a base station to a user equipment; code for inserting the radio timer information into data traffic information to be sent from the radio network element to a content server serving and adapting the data stream, wherein the data traffic information corresponds to and is in response to reception of the data stream; and code for sending the data traffic information including the inserted radio timer information from the radio network element to the content server.

A further example method comprises: receiving radio timer information corresponding to data transmission of part of a data stream from a base station to a user equipment, the receiving occurring at a content server performing streaming of data of which the data transmission is a part; adapting, based on the received radio timer information, streaming strategy for the streaming the data stream toward the base station for transmission by the base station to the user equipment; and streaming the data stream toward the base station based on the adapted streaming strategy.

An additional example of an embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer.

An example of an apparatus includes one or more processors and one or more memories including computer program code. The one or more memories and the computer program code are configured to, with the one or more processors, cause the apparatus to perform at least the following: receiving radio timer information corresponding to data transmission of part of a data stream from a base station to a user equipment, the receiving occurring at a content server performing streaming of data of which the data transmission is a part; adapting, based on the received radio timer information, streaming strategy for the streaming the data stream toward the base station for transmission by the base station to the user equipment; and streaming the data stream toward the base station based on the adapted streaming strategy.

A further example apparatus comprises: means for receiving radio timer information corresponding to data transmission of part of a data stream from a base station to a user equipment, the receiving occurring at a content server performing streaming of data of which the data transmission is a part; means for adapting, based on the received radio timer information, streaming strategy for the streaming the data stream toward the base station for transmission by the base station to the user equipment; and means for streaming the data stream toward the base station based on the adapted streaming strategy.

An example of a computer program product includes a computer-readable storage medium bearing computer program code embodied therein for use with a computer. The computer program code includes: code for receiving radio timer information corresponding to data transmission of part of a data stream from a base station to a user equipment, the receiving occurring at a content server performing streaming of data of which the data transmission is a part; code for adapting, based on the received radio timer information, streaming strategy for the streaming the data stream toward the base station for transmission by the base station to the user equipment; and code for streaming the data stream toward the base station based on the adapted streaming strategy.

BRIEF DESCRIPTION OF THE DRAWINGS

In the attached Drawing Figures:

FIG. 6 is a graph of video data rate illustrating the rate is constant irrespective of available bandwidth;

FIG. 7 illustrates an example of a QoE feedback trace from a UE towards a server;

FIG. 8 describes an example of steps and associated message sequences for an example of an embodiment.

DETAILED DESCRIPTION OF THE DRAWINGS

The examples of the embodiments herein describe coordinated techniques to improve application, network and device resource utilization for a data stream. Additional description of these techniques is presented after a system in which the examples of the embodiments may be used is described.

Figure 1:
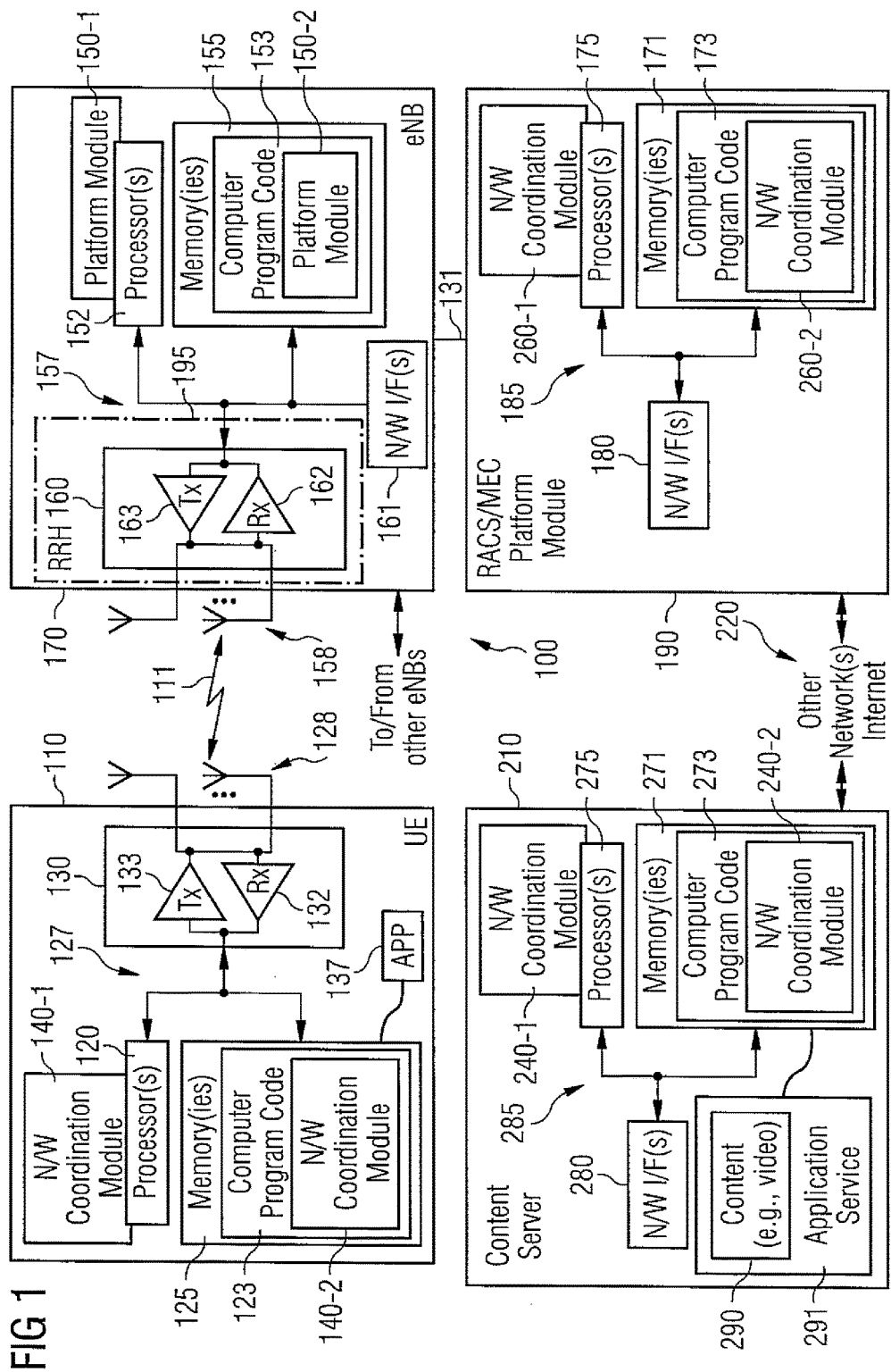
FIG. 1 is a block diagram of an example of a system in which the examples of the embodiments may be practiced.

Turning to FIG. 1, this figure shows a block diagram of an example of a system in which examples of embodiments may be practiced. In FIG. 1, a UE 110 is in wireless communication with a wireless network 100. The UE 110 is communicating through the wireless network 100 with the content server 210, e.g., which may be separate from the network 100 such as being on the Internet or other network, or may be integrated with the wireless network 100. A typical scenario is a user (not shown), using an application (APP) 137 of UE 110, is accessing content 290 provided by an application service 290 on the content server 210. The content 290 is assumed to be video, although the techniques presented herein are applicable to other content that can be presented to the application 137 (and therefore a user using the application 137). As explained briefly above and in more detail below, the wireless network 100 has a task of providing a suitable user experience while the user accesses the content 290, and the wireless network 100 may not be able to achieve a suitable user experience.

Although only one UE 110 is shown, this is merely an example and multiple UEs 110 may access the wireless network 100 via the eNB 170. Similarly, there may be multiple eNBs 170 as part of the wireless network 100, although only one is shown. The wireless network 100 is typically a mobile (also called "cellular") network.

Coordinated techniques to improve application, network and device resource utilization may be performed by the N/W (network) coordination module 140 in the UE 110, N/W (network) coordination module 260 in the RACS/MEC platform module 190, and the N/W (network) coordination module 240 in the content server 210. These techniques are described in more detail below. The RACS/MEC platform module 190 is illustrated in FIG. 1 as a separate entity in the wireless network 100. However, the RACS/MEC platform module could be implemented as part of the eNB 170, and is shown as platform module 150 in the eNB 170. Note that between the RACS/MEC platform module 190 and the content server 210, there are other entities that are not illustrated in FIG. 1 for convenience. Such entities are commonly part of a mobile network and some of these are shown in another figure.

The user equipment 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123 and the application (APP) 137. The UE 110 includes a N/W coordination module 140, comprising one of or both parts 140-1 and/or 140-2, which may be implemented in a number of ways. The N/W coordination module 140 may be implemented in hardware as N/W coordination module 140-1, such as being implemented as part of the one or more processors 120. The N/W coordination module 140-1 may be implemented also as an integrated circuit or through other hardware such as a programmable gate array. In another example, the N/W coordination module 140 may be implemented as N/W coordination module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 executes the application 137, which provides a service to a user by accessing the content server 210. The UE 110 communicates with eNB 170 via a wireless link 111.

The eNB 170 is a base station that provides access by wireless devices such as the UE 110 to the wireless network 100. The eNB 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The eNB 170 may include, in one example of an embodiment, a RACS/MEC platform module 150, comprising one of or both parts 150-1 and/or 150-2, which may be implemented in a number of ways. The RACS/MEC platform module 150 may be implemented in hardware as RACS/MEC platform module 150-1, such as being implemented as part of the one or more processors 152. The RACS/MEC platform module 150-1 may be implemented also as an integrated circuit or through other hardware such as a programmable gate array. In another example, the RACS/MEC platform module 150 may be implemented as RACS/MEC platform module 150-2, which is implemented as computer program code 153 and is executed by the one or more processors 152. For instance, the one or more memories 155 and the computer program code 153 are configured to, with the one or more processors 152, cause the eNB 170 to perform one or more of the operations as described herein. The one or more network interfaces 161 communicate over a network such as via the links 176 and 131. Two or more eNBs 170 communicate using, e.g., link 176. The link 176 may be wired or wireless or both and may implement, e.g., an X2 interface. Note that this is a very simplified version of an eNB, and a typical eNB would have many more elements, such as schedulers and the like.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195, with the other elements of the eNB 170 being physically in a different location from the RRH, and the one or more buses 157 could be implemented in part as fiber optic cable to connect the other elements of the eNB 170 to the RRH 195.

The wireless network 100 may include the RACS/MEC platform module 190, which is coupled in this example to a data communications network (e.g., the Internet) 220. If the RACS/MEC platform module 190 is used, the RACS/MEC platform module 150 in the eNB 170 is typically not used. The eNB 170 is coupled via a link 131 to the RACS/MEC platform module 190. The RACS/MEC platform module 190 includes one or more processors 175, one or more memories 171, and one or more network interfaces (N/W I/F(s)) 180, interconnected through one or more buses 185. The RACS/MEC platform module 190 includes a N/W coordination module 260. The one or more memories 171 include computer program code 173. The N/W coordination module 260 may be implemented as an integrated circuit or through other hardware such as a programmable gate array, as illustrated by N/W coordination module 260-1. In another example, the N/W coordination module 260 may be implemented as N/W coordination module 260-2, which is implemented as computer program code 171 and is executed by the one or more processors 175. For instance, the one or more memories 171 and the computer program code 173 are configured to, with the one or more processors 175, cause the RACS/MEC platform module 190 to perform one or more of the operations as described herein.

The wireless network 100 is coupled to the content server 210 in this example. The content server 210 includes one or more processors 275, one or more memories 271, and one or more network interfaces (N/W I/F(s)) 280, interconnected through one or more buses 285. The content server 210 further includes a N/W coordination module 240. The one or more memories 271 include computer program code 273 and an application provider 291 shown as having the content 290. The content 290 may also be stored separately from the application provider 291. One function of the content server 210 is to serve, e.g., using the application provider 291, the content 290 to the UE 110. For instance, for video, the content server 210 sends portions of a video to the UE 110 so that the user views the video during video playback, ideally without interruption or other errors. The N/W coordination module 240 may be implemented as an integrated circuit or through other hardware such as a programmable gate array, as illustrated by N/W coordination module 240-1. In another example, the N/W coordination module 240 may be implemented as N/W coordination module 240-2, which is implemented as computer program code 271 and is executed by the one or more processors 275. For instance, the one or more memories 271 and the computer program code 273 are configured to, with the one or more processors 275, cause the content server 210 to perform one or more of the operations as described herein.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, 171, and 271 may be of any type suitable to the local technical environment and may be implemented using any suitable data storage technology, such as semiconductor based memory devices, flash memory, magnetic memory devices and systems, optical memory devices and systems, fixed memory and removable memory. The processors 120, 152, 175, and 275 may be of any type suitable to the local technical environment, and may include one or more of general purpose computers, special purpose computers, microprocessors, digital signal processors (DSPs) and processors based on a multi-core processor architecture, as non-limiting examples.

In general, the various embodiments of the user equipment 110 can include, but are not limited to, cellular telephones such as smart phones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Concerning current techniques for serving data from a content server to a UE, the following includes a summary of possible problems with the current techniques.

There are several variations in Pseudo streaming and DASH (dynamic adaptive streaming over HTTP) streaming algorithms. All of them do not take IP network conditions, radio network conditions, and video quality into consideration to stream the content. Due to this, the algorithms create side effects to radio network, user devices and services.

For video services such as YouTube (or similar) when these receive throughput guidance from radio networks, these services do not utilize this guidance optimally. ASP servers utilize the TG information only at certain time periods, and it has been realized that such partial utilization creates side-effects such as poor radio spectrum usage and unnecessary UE energy consumption.

Video server behavior or streaming techniques remain the same. For instance, the server either uses fixed TCP spacing or use constant time-based scheduling of packets or changes to the video quality. Such non-adaptive schemes cause more power usage by the UE 110 and poor utilization of radio resources.

There is no way to know the effective utilization of the TG information sent to ASPs. Hence, operators do not know whether user QoE and ASP performance criteria are met or not.

IP network, radio network throughput guidance and selection of video quality alone are not sufficient to provide substantial resource utilization. Lack of synchronization between a video streaming strategy and radio timers leads to uneven loading of RAN networks and impacts scheduling of user data inside RAN.

Based on our research and experience in working with ASPs, many vendors and academia are trying out different video streaming algorithms. Existing algorithms are not synchronized with radio network scheduling timers. Therefore, this still creates side effects such as unnecessary signaling in radio network, and consumes more power from the UE and drains the battery of the UE quickly.

Also, it has been observed that during a video session, supplementary information is exchanged between the server and UE devices or client applications. These information exchanges must be synchronized in time for optimal usage of radio network resource.

More specifically regarding problems with current techniques for serving data from a content server to a UE, throughput guidance, available bandwidth and congestion avoidance are basic mechanisms that were experimented with by a number of companies. Lack of coordination between network features and application service created following side-effects.

First, assume the following preconditions: 1) User A and User B, each having a device UE1 and UE2 respectively; both users are subscribed to the same subscriber plan; and User A's device UE1 is attached to eNodeB 1 (supplied by vendor A), and User B's device UE2 is attached to eNodeB 2 (supplied by vendor 2) respectively.

Assuming the above preconditions, below are the three scenarios to explain possible problems with conventional systems.

(a) When the radio network conditions and load for eNodeB 1 and eNodeB 2 are the same, it has been observed that when the both the users watch a video, for one of the users, the battery of the UE drains quickly. Lack of coordination between data delivery to radio timers lead to unnecessary network occupancy of the UE for this user.

(b) When the radio network conditions and load for eNodeB 1 and eNodeB 2 are the same, it has been observed that when the both the users watch the video, one of the user's device generates less network signaling while other generates more network signaling. Lack of coordination between data delivery to radio timers leads to excessive signaling.

(c) When the radio network conditions and load of the eNodeB1 and eNodeB 2 are the same, even though one of the UE's applications received network guidance information through TG, there was a side effect of poor radio spectrum utilization, as this spectrum utilization was not adapting properly. Even when guidance information is provided by the RAN, ASP is not making any alteration to their streaming mechanism and this causes adverse side-effects. Performing fixed TCP spacing or using fixed video data rate causes more problems in the network, such as faster UE battery drain, uneven load on radio networks, and the like.

In addition, when TG is not used effectively, just a few UEs 110 can block an eNodeB 170 and create a radio resource shortage. Also, this makes it difficult for operators to set radio timer values, as the server data is not synchronized with radio timer values. Further, when operators apply fixed-rate control and TCP pacing to save network bandwidth and to perform JIT delivery, this results in faster battery drain and poorer radio network utilization.

To elaborate further, both progressive (e.g., pseudo) streaming, and adaptive bit rate streaming are not optimized for network and UE energy usage. Most of the optimization so far was carried out to improve QoE of users such as reducing the number of rebuffering occurrences (e.g., video stalls) or reducing the time to play. In this description, we have and will use video streaming as an example to describe problems and the side effects, although the techniques herein are not limited to video streaming.

Figure 2:
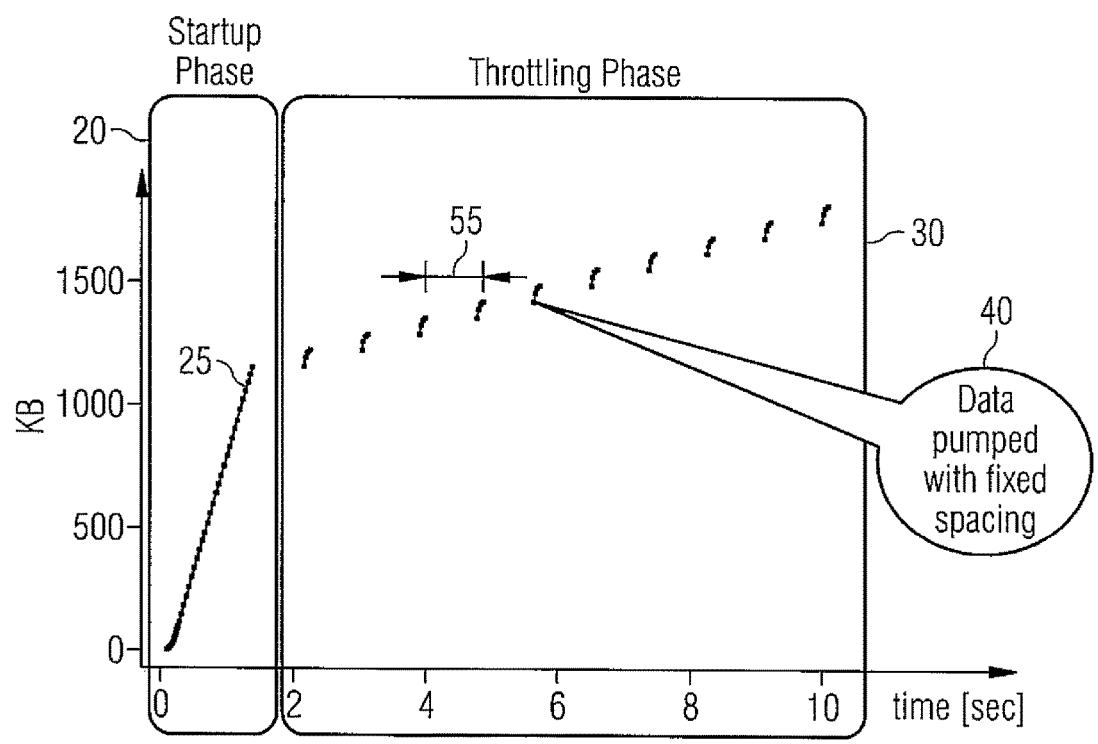
FIG. 2 is a graph of TCP rate control for an example of a video session.

Video streaming typically uses HTTP based streaming and supports both progressive and adaptive bit rate streaming. Video streaming may support JIT, and it does this by using two phases, namely start-up and throttling phases as shown in FIG. 2. FIG. 2 is a graph of TCP rate control for an example of a video session. See also Ghobadi, M., Cheng, Y., Jain, A., and Mathis, M., "Trickle: Rate Limiting YouTube Video Streaming", USENIX 2012 Annual technical Conference.

The start-up phase 20 is illustrated in FIG. 2. When the user starts the video, the server sends the data quickly (e.g., as much as possible) till the amount of data reaches a certain threshold value. The goal of this phase is to start video early and send more than the required amount of data so as to avoid any re-buffering during play. Thus, line 25 indicates a high-slope and a lot of data transmitted (in KB, kilobytes) in a relatively short time.

Figure 3:
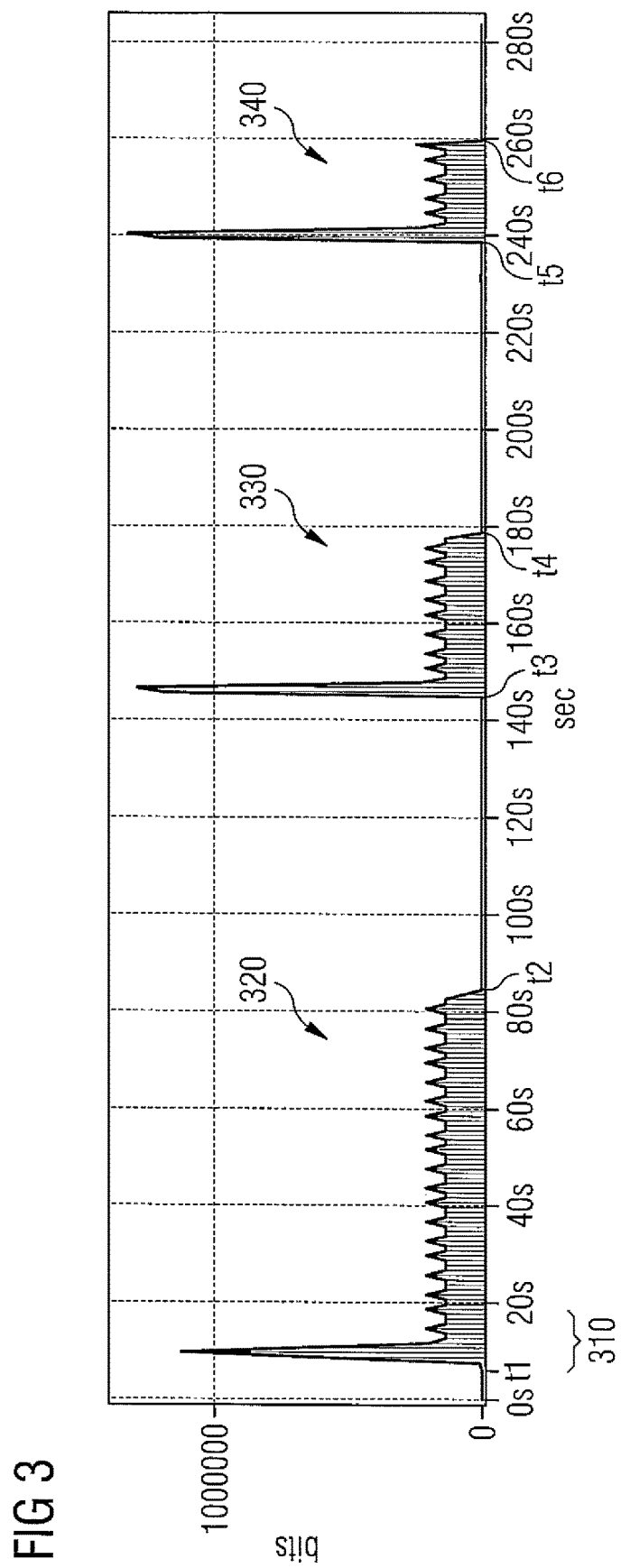
FIG. 3 is an illustration of an example of a progressive streaming network trace.
Figure 4:
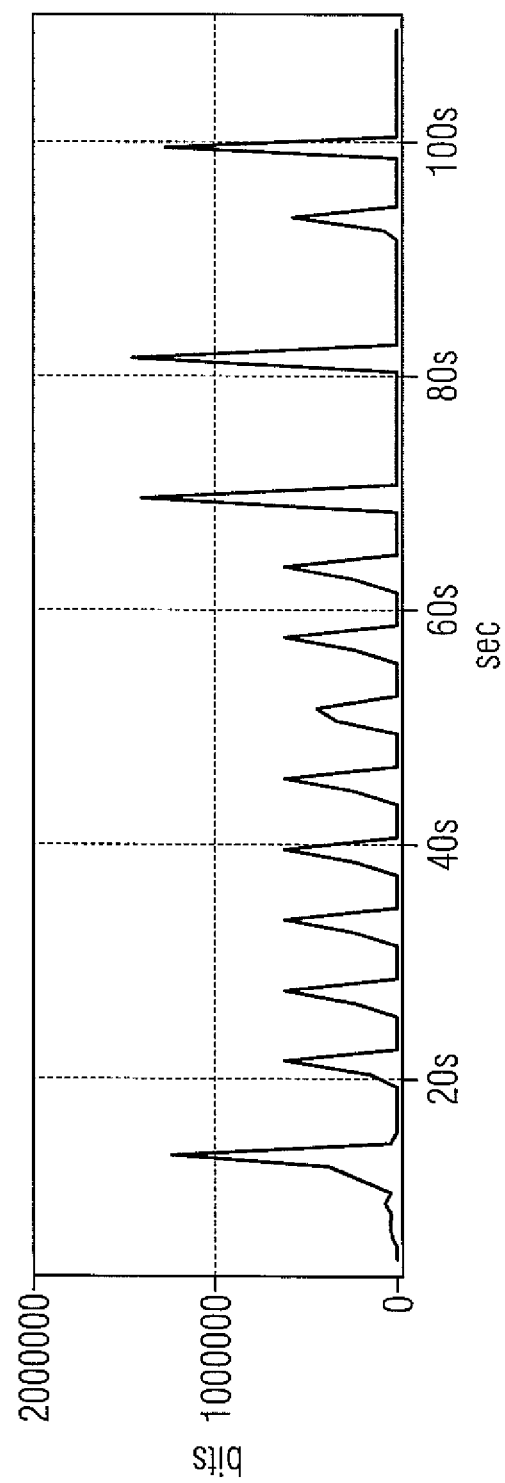
FIG. 4 is an illustration of an example of an adaptive bit streaming network trace.

The throttling phase 30 is also illustrated in FIG. 2. The video server, after sending required amount of data for start-up phase, changes to the throttling phase 30. During this phase 30, the server uses fixed bandwidth and does a fixed TCP pacing of packets, as illustrated in in FIG. 3, where there are shown between 15 to 85 seconds of duration and the corresponding TCP trace will be as shown in FIG. 2. Transmission of data occurs for about 85 seconds for the network trace illustrated by reference 320, for about 35 seconds for reference 330, and for about 22 seconds for reference 340. The TCP trace in FIG. 2 corresponds to a time period of the first part (see reference 320) of FIG. 3, as illustrated by time period 310. The server performs TCP pacing of packets, and writes 64 KB of data for each "pumping" of data (see reference 40 of FIG. 2). To avoid re-buffering during the entire playback, the streaming server sends data 1.25 times the video data rate and this data is sent at fixed intervals 55 using a fixed TCP pacing technique as shown in FIG. 2. Once the client buffer (of UE 110) is full, as shown in FIG. 3, at t2, the client sends TCP close. The UE client application continues to play data from the buffer, and when the buffer reaches a minimum value at t3 as shown in FIG. 3, the client initiates a new HTTP request and a request for remaining data. During video playback, no video data is exchanged during the t2 to t3 and the t4 to t5 time periods. This idle period is variable and depends upon the available bandwidth and requested video rate. The fixed pacing is also observed in ABR streaming, when the chunk size is between 5 to 9 seconds duration as shown in FIG. 4.

It should be noted that, in ABR, the client (e.g., UE 110) makes a decision and selects an appropriate bit rate but data rate that is delivered for the selected "chunk" of video is still under server control. It is additionally noted that it is observed both in ABR and pseudo streaming that either the client or the server generates certain feedback messages. These messages are not piggybacked along with the video data; instead they are sent much after the video data and this extends the time quantum. That is, the time quantum corresponding to communication of the video data is extended because the messages are not piggybacked along with the video data. This leads to UE network occupancy extension, unnecessary UE battery consumption and very poor eNodeB scheduler utilization.

By taking a closer look at each throttling phase period, and fixed TCP pacing, it has been realized that due to the blind fixed TCP pacing, adverse effects to UE battery and radio states are created. That is, the UE consumes more energy because the UE is always in a connected state, and less data is exchanged over longer periods of time, which consequently drains the battery quickly. It has been studied that pacing without knowledge of the network conditions creates poorer radio network utilization than does regular TCP. In order to solve this problem, with both pseudo streaming and ABR streaming techniques, the streaming server should take into consideration the target radio network conditions, and, e.g., perform variable spacing.

We also encountered the concept of Adaptive Video Pacing (AVP), wherein, based on the available bandwidth, the video server will adjust its sending rate. But the guidance that the network provides is just available bit rate or throughput, which alone is not sufficient; this may improve the QoE of users by keeping the network occupied all the time. However, a single application (or a single UE) monopolizing the network (and, e.g., not allowing the RAN to make this flow sleep) all the time is a detriment. At the lowest level of AVP, we have seen that AVP does perform a fixed TCP pacing scheme for the required time quantum. When Continuous Packet Connectivity (CPC) features are enabled in the network, the lack of coordination between the adaptive video pacing and the timer makes CPC features ineffective.

Figure 5:
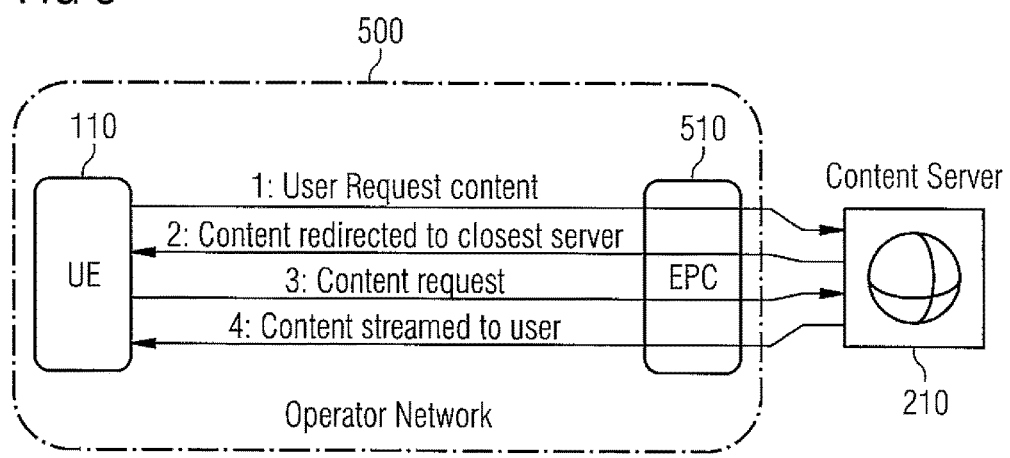
FIG. 5 illustrates a possible video streaming architecture.

Referring to FIG. 5, this figure illustrates a possible video streaming architecture. The operator network 500 in this example services the UE 110, and the UE 110 requests (Step 1) content from the content server 210. The EPC 510 is responsible for the overall control of the UE and establishment of bearers. The main logical nodes of the EPC are the Packet Data Network GateWay (P-GW), Serving-GateWay (S-GW) and Mobility Management Entity (MME) (none of which are shown). The content is redirected (Step 2) is redirected to the closest server, which in this example is the content server 210. Steps 3 (content request) and 4 (content streamed to user) would occur multiple times during video playback by the UE 120.

Experiments have been performed with several streaming algorithms in lab environments. Based on several experiments and different ASP video streaming algorithms, it has been observed that, when available bandwidth is much higher than the data rate required to play the video, the ASP performs following actions.

As shown in FIG. 6, the video server (e.g., content server 210) does not generate data as suggested by TG server. Instead they use fixed bandwidth. This approach does not use radio spectrum efficiently, as the UE consumes more power since the device needs to receive data at constant rate.

The video server also performs fixed TCP pacing and this pacing creates even more problems for both the network and UE.

Proposals for examples of embodiments herein, which can ameliorate or solve the problems described above, include one or more of the following, which are examples and non-limiting.

Radio timer configuration information is exported to the video streaming server (e.g., content server 210), and the video streaming server could adjust its streaming of packets based on a time quantum.

Exported radio configuration is used as a window by the UE 110 and server 210, within which they exchange any supplementary data and thereby avoid unnecessary radio resource requests.

When throughput guidance and/or available bandwidth measurements are received from the radio network, the content server 210 should change its video streaming strategy accordingly, e.g., the content server should disable fixed-time-based pacing and use adaptable pacing of packets for transporting video.

Video QoE and battery measurements are periodically imported from the UE/server to the network. This will assure power-aware scheduling and radio timer adjustments.

Combining radio network configuration with other information and allowing, e.g., the application and UE to adjust the streaming data accordingly to reduce the signaling and UE energy consumption appear to be new concept.

We now present an example of an overview of possible examples of embodiments. In order to improve user experience, a lot of information should be combined and analyzed. Until now, applications and networks are served by different providers, and a user is often impacted with poor experience.

For illustration, we reference an ASP video service for both plain text traffic and encrypted SSL session. This is for illustration purpose only; the scope of the examples of solutions can apply to other services.

As described above, FIG. 5 illustrates a possible video streaming architecture. As discussed above, a problem that exists today is that, during a video streaming session, data is sent in bursts. These bursts must be spaced, packed and scheduled in a fashion that matches the UE allocated radio time, available network bandwidth, and radio network load conditions. Otherwise, each UE 110 may request more network time and drain its battery quickly as well lead to poor spectrum utilization when delivered data is much less than the TG rate.

Some examples of proposals to ameliorate of solve these problems are as follows.

1. Application servers such as content server 210 should know the radio configuration and an allocated UE time to send the data. A Mobile Edge Computing Platform (e.g., RACS), such as RACS/MEC platform module 190/150, receives various instantaneous radio information from eNodeB 170, to compute cell load, throughput guidance, and the like. All this information can be communicated to content server 210, e.g., as part of the TCP protocol, such as by enriching the header information. This will solve the ASP concern. See, e.g., Jain, A., et al., "Mobile Throughput Guidance Signaling Protocol," IETF draft (work in progress), draft-flinck-mobile-throughput-guidance-00.txt, October 2014. The Jain article describes how to pass TG to the ASP; but does not cover at least the aspect of the timers as used herein. In addition to the radio network conditions, the RACS/MEC platform module 190/150 supplies the configured or allocated radio timers for LYE to the content server 210.

2. The UE 110 reports its energy (e.g., power) consumption to the application server (e.g., content server 210) periodically so as to improve the streaming delivery strategy. The ASP, i.e., the content server 210, can push the received information from the UE to Mobile Edge computing platform (e.g., RACS/MEC platform module 190/150) to adjust optimal radio configuration.

For instance, for each identified user sessions, the RACS/MEC platform module 190/150 supplies radio related information along with supplementary information needed to improve user experience of the video traffic. The application running 137 on the client device (UE 110) typically sends periodic feedback about the perceived quality level, and this gets reported directly back to the content server 110. FIG. 7 illustrates an example of QoE feedback trace 700 from the UE 110 towards the content server 210. For this example, the UE 110 reports the video session information 710, but this may be extended to include energy consumption information 720 during the video exchange. The content server 210 learns and adjusts, as part of a video streaming strategy, the video stream to improve QoE. The content server 210 may also echo the same instantaneous information 700 back to the RACS/MEC platform module 190/150, and the content server 110 may also send summary information 700 to the MEC when the session is completed. The RACS/MEC platform module 190/150 may use this information internally to summarize the same to an operator management infrastructure to validate the effectiveness of TG and also the information on ASP's utilization of TG information. The RACS/MEC platform module 190/150 shall also use this information to adjust the throughput guidance for future sessions. As a non-limiting example, when the "energy consumption during the video exchange" is known to the operator from the ASP, this metric can be used as a measure of the TG solutions' benefits. In addition, this can be used within the TG algorithm as a feedback to make the TG value more effective in real-time.

We now provide additional, more specific details of examples of embodiments. Turning to FIG. 8, this figure describes examples of steps and associated message sequences for an example of an embodiment. Additionally, FIG. 8 shows how the network, application, and user statistics may be collected and combined for both encrypted and plain text sessions. The example of FIG. 8 uses header enrichment (HE), although the embodiments are not limited to this example. Steps 1 to 4 are part of an MEC HE implementation, and this example of an embodiment builds on top of that concept to solve operator's problem. That is, HE is a concept covering supplementary information exchange between client and server, but certain examples of embodiments herein are in addition to this concept of supplementary information exchange. TCP options or header extensions or header enrichments are the same concept. FIG. 5 describes a user interaction between a content server 210 and client, e.g., UE 110. In FIG. 8, we describe examples of message interaction that might happen between messages 3 and 4 of FIG. 5. The content is being delivered by the content server 210 to the client and the client has received the content. In the example below, the client is the UE 110. Note that FIG. 7, for ease of reference and description, is a simplified diagram, and does not show other elements, such as the EPC 510 of FIG. 5, that would typically in a wireless network 100.

Step 1. As the video content is delivered over TCP, TCP ACK (as part of video traffic information) is generated as video traffic information periodically from the client (UE 110) and sent towards the server 210. For unidirectional video traffic such as downloaded video and movies, only video flows from server to client. For bi-direction video flow such as video conferencing, the video traffic information could be ACK information and also video data. This ACK packet (e.g., and/or video data), as the video traffic information, reaches the RACS/MEC platform module 190 via the eNodeB 170. Note in this example the RACS/MEC platform module 190 is shown separate from the eNodeB 170, but can be tightly coupled to/incorporated within the eNodeB 170, e.g., as illustrated by RACS/MEC platform module 150 in FIG. 1. The client application 137 (see FIG. 1) starts interaction with the OS (not shown) of the UE 110 and determines the available energy (e.g., power) for that session. In an example, the available energy may be a battery consumption/drain rate and also current availability. Indication(s) of the available energy may include value(s) of one or both of the battery consumption/drain rate and also current availability or a value that provides an estimate of these or other information. The information that can be used for the available energy can also depend on the particular UE and the OS involved.

Step 2. The eNodeB 170 has information about configured radio timers and current radio network conditions and associated parameters for each UE. The current radio network conditions and associated parameters may include the cell load, the radio condition of the UE (e.g., is it in the line of sight or near to the tower, and the like), which can be used to calculate the effective TG. The eNodeB 170 supplies that information to the RACS/MEC platform module 190. The eNodeB supplies the radio configuration information that the eNodeB has allocated to each UE and its associated state information as a vector, in an embodiment. For optimal use of time resources, the ASP (as the content server 210) is supposed to send the video data based on the throughput guidance (TG) from the radio network and also the ASP should complete or schedule the burst within the allocated radio timer value.

One example of the vector that may be supplied via the signaling in Step 2 is shown as message 830. The values below are valid for a time quantum. A time quantum corresponds to a timer value. For example, for the next three seconds (the time quantum), the UE can send X bandwidth in uplink and Y bandwidth in downlink. The network (e.g., the RACS/MEC platform module 190) generates the time quantum and within this time quantum determines bandwidth allowance (or allowed for a UE). However, in response to UE reported energy drain characteristics (e.g., via an energy consumption message) after performing data presentation to an app 137, then the network can use the reported battery drain in each time quantum as an additional information to remap the future time quantum and available bandwidth to UE.

The timer interval is generated based on the load of the network, UE location, UE traffic in each direction etc. For each time quantum, the network availability and bandwidth that the UE can get from the server is communicated. Values for the below may be determined using, e.g., one or more of the following: the moving average of load, ongoing network load, UE-specific number of sessions, bandwidth consumed by each session, DRX, DTX, CPC timer intervals. This message may include some or all of the following:

1) Minimum_Time: What is the minimum time that the UE will be powered, and consume energy in a dedicated State?

2) State_Time: What is the time that UE will still be powered, even if there is no activity seen towards that UE?

3) Park_Time: What is the time that the UE could be parked immediately to an intermediate state (e.g., low power state)? Regarding states, in LTE, there are two states namely connected and IDLE. Whereas, in 3G there are more states. The intermediate state—If we need to use the solution to 3G). For LTE—We stated intermediate state as to reduce the number of times the UE needs to wake and get connected to network. Avoiding aggressive (too much) switching between idle and connected or lazy (very few switching between idle and connected state.

4) Scheduling Time: The RAN network determines this time interval, which is the interval in which the content server 210 and the UE 110 should exchange all the data. This also called the synchronization timer, where both endpoints should push the data to save TJE energy, save RAN scheduling and provide optimal use of network resources.

5) Scheduling_BW(TG): This is the available bandwidth that the server/client could use for the time quantum (i.e., scheduling time) proposed so as to realize satisfactory QoE.

Elements (1)-(4) are characterized as radio timers herein. Examples of other radio timers include one or more of the following: DRX—Discontinuous Reception (Uplink, Downlink); DTX—Discontinuous Transmission (Uplink, and Downlink), which are basic timers. Additionally, radio timers may also include the Idle timer interval and the Connected state timer duration. Element (5) is a derived value. It may be determined, e.g., by combining (1) to (4)+network load+UE energy profile. Information about radio timers is provided so that we achieve a balance such that the network can reduce energy consumption of UE, reduce network occupancy time of each UE, and increase bandwidth available for each UE. In an example, all information coming from a RAN may be generalized as radio timers.

Step 3. The RACS/MEC platform module 190 enriches the TCP header extensions with the radio information for the identified ASP traffic (e.g., video in this example) to perform header enrichment.

Note: There are other mechanisms by which this information could be communicated, including insertion of information at the IP layer, or transport protocol layer or link layer or application layer, either as in-band or out-band. In this example, we described the mechanism using TCP layer. However, this can be applied even using methods in other layers (including IPV6 or ICMP).

Step 4. The RACS/MEC platform module 190 forwards the ASP traffic after HE processing towards the content server 210.

a. Note: there are several possible ways to communicate this information as part of IPv4 or IPv6 or TCP to the content server. The concept is that the information is delivered, and it is consumed by the ASP (as the content server 210).

b. The HE information contains, e.g., radio timer information, TG information, along with time quantum information. Radio timer information provides the time under which the bandwidth can be used and also tells that how the timer should be used by server in order to avoid unnecessary signaling in the RAN network. Also, using the radio timer information allows the server to change the streaming strategy to ensure that reported bandwidth is consumed.

Step 5. To utilize network resources, including both radio spectrum and fixed network infrastructure, the ASP (as content server 210) should process the HE information and take one or more actions. This step could be ASP service dependent, but in general, the ASP would make decisions on streaming strategy, such as performing TCP congestion window changes, and/or performing some adaptive TCP pacing to ensure that the TG information is effectively utilized (e.g., disabling fixed time-based pacing and using adaptable pacing of packets instead). All these should conform to the radio time value (e.g., the time quantum), and should avoid causing the UE to extend continuous network occupancy or excessive radio state switching.

Step 6. The user (as operator of the UE 110) and the network 100 see adapted video traffic from the content server 210. The video traffic may be adapted by performing TCP congestion window changes, and/or performing some adaptive TCP pacing. In addition (or instead of the previous) the HE information can be used by the application layer to manipulate the ABR.

Step 7. The UE 110 periodically prepares various reports, such as one or more of the following: available bandwidth (e.g., seen by the UE, which involves measuring with a rate at which there is no error), signal strength, application-specific quality level (e.g., QoE which may provide an indication of the time to play, rebuffering events, and the like), and various other networks. What is meant by various other networks is that it is also possible to determine from adjacent eNodeB networks the load conditions (e.g., this is possible if the RAN network is a cloud-based RAN and all eNodeBs are controlled by single RAN). These are reported to the content server 210, and some details of such examples of traces are shown in FIG. 7. In addition to QoE reports, the UE 110 may also generate power profile and energy consumption (EC) (e.g., as energy consumption information 720) already used and/or estimated to be used to play the video. This also gets reported to the content server 110.

a. Note: This report should be generated either immediately after receiving the video chunks or during the video chunk transfer. The goal of sending this report is to provide the feedback to both the server and network.

b. Note: The report may contain information about battery consumption (e.g., energy consumption) and video QoE metrics. The UE battery consumption value is used by the eNodeB scheduler to improve the performance of the scheduler. The eNodeB scheduler will learn the UE power drain characteristics to schedule the data accordingly to the UE. Such a mechanism makes the eNodeB 170 a power aware scheduler and allows for radio timer adjustments. For instance, based on the quality of experience and energy consumption reports from the content server, the eNB 170 (e.g., with the RACS/MEC platform module 150) can perform scheduling of user equipment packets to increase or decrease available bandwidth to the user equipment to cause corresponding adjustments in energy level of the user equipment. That is, an increase in bandwidth might cause an increase in energy level and a decrease in bandwidth might cause a decrease in energy level.

c. Note: Similar to the previous step (Step 6), the content server 210 can also perform adaptive pacing of streaming strategy to improve the UE battery life.

Step 8. The content server 210 can prepare a UE-specific QoE and EC report, along with server-generated reports to send these to the RACS/MEC platform module 190. This information may be communicated to the RACS/MEC platform module 190 as part of a TCP header extension message to perform header enrichment.

a. Note: There are several possible ways to communicate this information as part of IPv4 or IPv6 or TCP to the RACS/MEC platform module 190.

b. It is also possible to run an IPv6 ICMP message and exchange over this.

c. As many mobile networks will become fully IPv6 in near future, this could be sent at IPv6 layer information, e.g., by manipulating and reserving flow label information specific messages.

d. At this stage, there are various choices and options possible for this implementation. For large search-engine companies, these might deploy their servers in more than 150 countries, and it is easier for a mobile network operator to have such extensions provisioned between the RACS/MEC platform module 190 and the content server 210. One possibility is to have such information to be communicated either at IP or at TCP layer.

Step 9. The RACS/MEC platform module 190 receives, then extracts, QoE and EC information, and forwards the actual video traffic towards the UE.

Step 10. The RACS/MEC platform module 190 collects the instantaneous and summary learning of QoE and EC reports from the content server 210. The RACS/MEC platform module 190 can use this information, in an example of an embodiment, as a measure of the TG solutions' benefits. In addition, this can be used within the TG algorithm as feedback to make the TG value more effective in real-time. Further, this may be thought of as self-correction for networks. The network learns the feedback from the UE 110 in terms of battery consumption versus network quality. The network keeps adjusting the timers (e.g., increasing or decreasing their values) all the time to see what is the maximum bandwidth that the network can provide to each UE and at the same time keep the energy consumption of UE to a minimum or at least reduced relative to not adjusting the timers. Adjustment for future time quanta may take all aspects into account, including any adjustments made by the content server and including reporting of future timer values, future bandwidth, and the like to affect the streaming strategy (e.g., at both the content server 210 and at the RACS/MEC platform module 190). UE energy consumption is taken as one of the inputs.

That is, referring to messages 9 and 10, after receiving the feedback from the UE or server at the RACS/MEC platform module 190, the RACS/MEC platform module 190 takes actions as follows. It is noted that the eNB 170 may take similar or the same action, e.g., if the eNB 170 includes the RACS/MEC platform module 150.

a) Available energy (e.g., power) consumption may be provided as one of the feedback values to the network. This may provide, for instance, the battery drain characteristic of the UE, and network can map this against the available bandwidth internally.

b) The scheduling timer is a variation of the time quantum for each UE.
This timer may be adjusted accordingly based on the battery conditions.

c) Finally, quality level that is delivered to the UE based on the guidance towards UE or server is used by the network as input to derive the next time quantum values.

Step 11. The UE 110 terminates a session (or the session is terminated by the content server 110) either normally or abnormally.

Step 12. The content server 210 prepares QoE and EC summary report for sending to the RACS/MEC platform module 190.

Step 13. The content server 210 sends the QoE summary report at the time of TCP FIN (indicating ending of the session) using an HE mechanism or other suitable IP or ICMP header extension mechanism. One example of a proposal is to follow the same RACS HE extension proposal from RACS/MEC platform module 190 to the content server 210 so that consistency is maintained in implementation. However, this is not a requirement and many other techniques may be used.

Step 14. The RACS/MEC platform module 190 processes the QoE summary, session summary and this provides more insight for time series analysis. See the description with respect to Step 10 for possible time series analysis insight.

Step 15. The information contained for each micro-flow of user session may be made available to the Operator-Management-Interface (OMI) for further analysis or for other purposes such as corrective action if there is a poor QoE or battery drain occurred.

FIGS. 9-12 are logic flow diagrams for coordinated techniques to improve application, network and device resource utilization of a data stream, and illustrate the operation of an example of a method, a result of execution of computer program instructions embodied on a computer readable memory, functions performed by logic implemented in hardware, and/or interconnected means for performing functions in accordance with examples of embodiments.

Figure 9:
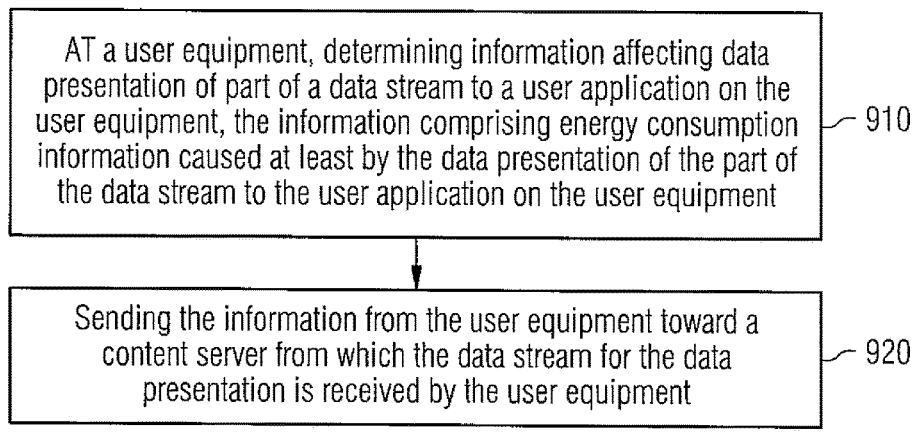
FIGS. 9-12 are logic flow diagrams for coordinated techniques to improve application, network and device resource utilization of a data stream, and illustrate the operation of an example method, a result of execution of computer program instructions embodied on a computer readable memory, functions performed by logic implemented in hardware, and/or interconnected means for performing functions in accordance with examples of embodiments.

FIG. 9 concerns the UE 110, e.g., under control in part of the N/W coordination module 140. The UE 110 in block 910 performs the operation of determining information affecting data presentation of part of a data stream to a user application on the user equipment. The information comprises energy consumption information caused at least by the data presentation of the part of the data stream to the user application on the user equipment. In block 920, the UE 110 performs the operation of sending the information from the user equipment toward a content server from which the data stream for the data presentation is received by the user equipment.

Another example is a method of FIG. 9, wherein the information further comprises information about a radio channel through which the data stream is received by the user equipment. A further example is a method as in this paragraph, wherein the information about the radio channel comprises one or more of the following: available bandwidth and signal strength.

Another example is a method as in FIG. 9 and any paragraphs referencing FIG. 9, wherein the data stream is received by the user equipment from the content server using a network, and wherein the information further comprises one or more reports about quality of user experience that occurs while the user application uses the network and an application service on the content server.

Another example is a method as in FIG. 9 and any paragraphs referencing FIG. 9, wherein the determining and sending are performed either immediately after receiving chunks of the data stream at the user equipment from the content server or during transfer of chunks of the data stream from the content server to the user equipment.

Another example is a method as in FIG. 9 and any paragraphs referencing FIG. 9, further comprising receiving additional data of the data stream from the content server, wherein the reception of the additional data is received at a schedule based upon the sent information.

Another example is a method as in FIG. 9 and any paragraphs referencing FIG. 9, wherein the data stream comprises video and wherein the data presentation to a user application comprises a video presentation of video data to the user application. The data stream may comprise other than video, such as gaming information, data to/from the cloud, and the like.

An example of an apparatus includes one or more processors and one or more memories including computer program code. The one or more memories and the computer program code are configured to, with the one or more processors, cause the apparatus to perform a method as in FIG. 9 and any paragraphs referencing FIG. 9. Another example of an embodiment is an apparatus comprising means for performing a method as in FIG. 9 and any paragraphs referencing FIG. 9.

Figure 10:
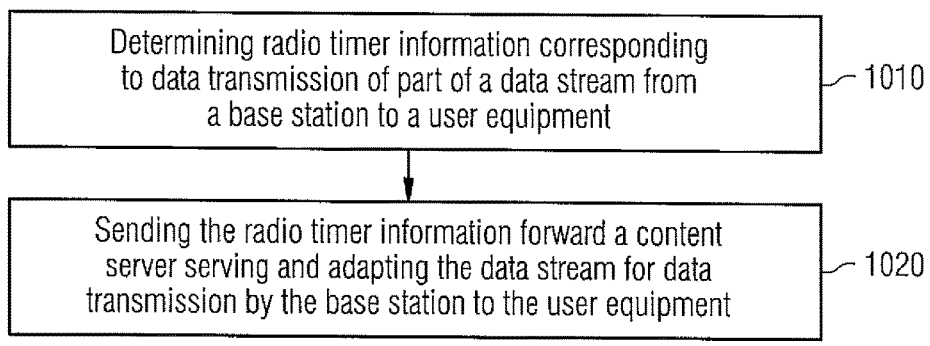

Referring to FIG. 10, this figure corresponds to a base station such as eNB 170, e.g., under control in part of the RACS/MEC platform module 150. The eNB 170 performs the operation, in block 1010, of determining radio timer information corresponding to data transmission of part of a data stream from a base station to a user equipment. In block 1020, the eNB 170 performs the operation of Sending the radio timer information toward a content server serving and adapting the data stream for data transmission by the base station to the user equipment.

Another example is the method of FIG. 10, wherein the radio timer information comprises one or more of the following: a minimum time that the user equipment will be powered and consume energy in a dedicated state; a time that the user equipment will still be powered, even if there is no activity seen towards the user equipment; a time that the user equipment could be parked immediately to an intermediate state; and a time interval in which the content server and the user equipment should exchange all data. A further example is the method of this paragraph, wherein the radio timer information is sent as part of a message and wherein the message further comprises an available bandwidth that the content server or user equipment could use for a time quantum proposed so as to realize satisfactory quality of experience for data presentation to the user application on the user equipment.

Another example is a method as in FIG. 10 and the paragraphs referencing FIG. 10, further comprising receiving one or more reports comprising one or both of quality of experience and energy consumption from one or both of the user equipment or the content server, wherein the quality of experience and the energy consumption concerns data from the data stream sent to the user equipment from the content server and presented to a user application on the user equipment, and using the received one or both of quality of experience and energy consumption to perform one or both of power aware scheduling of data transmissions of the data stream to the user equipment for the data presented to a user application and radio timer adjustments for the data transmissions of the data stream to the user equipment. The method of this paragraph, wherein using comprises, based on one or both of the quality of experience and the energy consumption from the content server, performing scheduling of user equipment packets to increase or decrease available bandwidth to the user equipment to cause corresponding adjustments in energy level of the user equipment.

Another example is a method as in FIG. 10 and the paragraphs referencing FIG. 10, wherein determining further comprises determining information about current radio network conditions and associated parameters for the user equipment and sending further comprises sending the information about current radio network conditions and associated parameters toward the content server.

Another example is a method as in FIG. 10 and the paragraphs referencing FIG. 10, wherein the data stream comprises video to be presented to a user application on the user equipment.

An example of an apparatus includes one or more processors and one or more memories including computer program code. The one or more memories and the computer program code are configured to, with the one or more processors, cause the apparatus to perform a method as in FIG. 10 and any paragraphs referencing FIG. 10. Another example of an embodiment is an apparatus comprising means for performing a method as in FIG. 10 and any paragraphs referencing FIG. 10.

Figure 11:
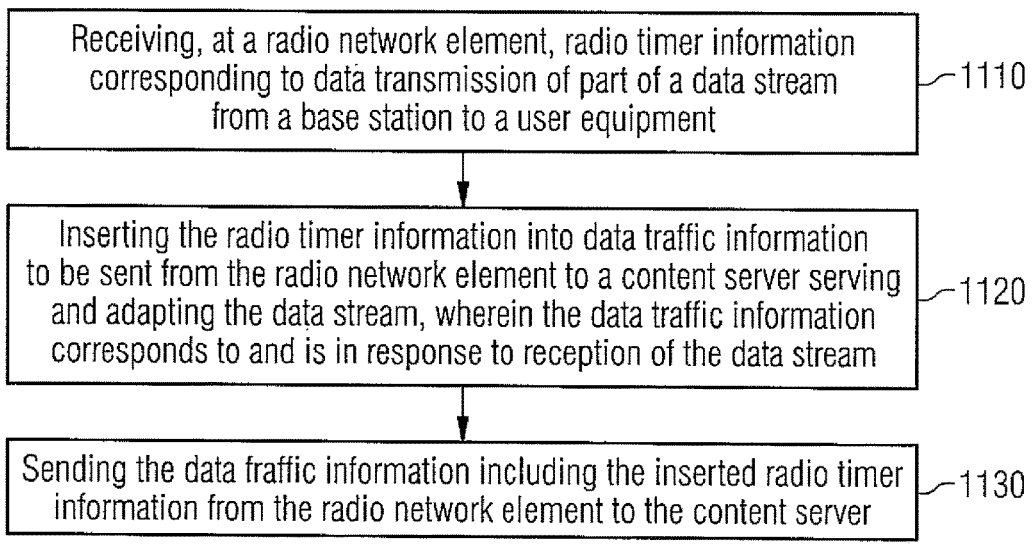

Referring to FIG. 11, this figure is performed by a radio network element such as the RACS/MEC platform module 190, e.g., under control of the N/W coordination module 260. However, the RACS/MEC platform module 190 is one example and the radio network element can be another element in the radio network. In block 1110, the radio network element performs the operation of receiving radio timer information corresponding to data transmission of part of a data stream from a base station to a user equipment. The radio network element in block 1120 performs the operation of inserting the radio timer information into data traffic information to be sent from the radio network element to a content server serving and adapting the data stream. The data traffic information corresponds to and is in response to reception of the data stream. That is, the data traffic information could be ACK information, video (such as for video conferencing/communicating), game playing information, large uploads of data corresponding to downloads of data, and the like. In block 1130, the radio network node performs the operation of sending the data traffic information including the inserted radio timer information from the radio network element to the content server.

Another example of an embodiment is the method of FIG. 11, wherein the radio timer information comprises one or more of the following: a minimum time that the user equipment will be powered and consume energy in a dedicated state; a time that the user equipment will still be powered, even if there is no activity seen towards the user equipment; a time that the user equipment could be parked immediately to an intermediate state; and a time interval in which the content server and the user equipment should exchange all data. A further example of an embodiment is the method of this paragraph, wherein the radio timer information is sent as part of a message and wherein the message further comprises an available bandwidth that the content server or user equipment could use for a time quantum proposed so as to realize satisfactory quality of experience for data presentation to the user application on the user equipment.

Another example is a method as in FIG. 11 and the paragraphs referencing FIG. 11, wherein inserting further comprises inserting the radio timer information into transmission control protocol header extensions for packets carrying at least some of the data traffic information.

Another example is a method as in FIG. 11 and the paragraphs referencing FIG. 11, further comprising receiving one or more reports comprising one or both of quality of experience and energy consumption from the content server, wherein the quality of experience and the energy consumption concerns data presentation of part of the data stream to a user application by the user equipment for the part of the data stream sent to the user equipment from the content server, and using the received one or both of quality of experience and energy consumption to perform one or both of power aware scheduling of subsequent data transmissions of data for the data stream to the user equipment and radio timer adjustments for the data transmissions to the user equipment.

Another example is a method as in FIG. 11 and the paragraphs referencing FIG. 11, further comprising receiving, from the content server, data traffic comprising data from the data stream for presentation to a user application and one or more reports comprising one or both of quality of experience and energy consumption, and forwarding the data but not the one or more reports from the radio network element to the user equipment.

Another example is a method as in FIG. 11 and the paragraphs referencing FIG. 11, wherein the radio network element is one of the following: a part of a base station or a separate entity from the base station.

Another example is a method as in FIG. 11 and the paragraphs referencing FIG. 11, wherein the data stream comprises video.

An example of an apparatus includes one or more processors and one or more memories including computer program code. The one or more memories and the computer program code are configured to, with the one or more processors, cause the apparatus to perform a method as in FIG. 11 and any paragraphs referencing FIG. 11. Another example of an embodiment is an apparatus comprising means for performing a method as in FIG. 11 and any paragraphs referencing FIG. 11.

Figure 12:
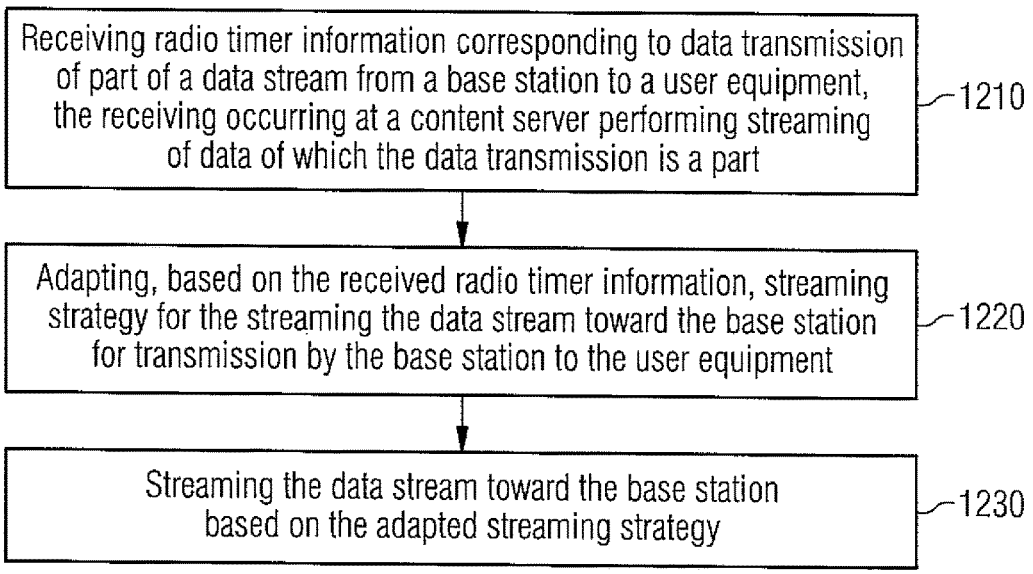

FIG. 12 is typically performed by a content server 210, e.g., under control in part by the N/W coordination module 240. In block 1210, the content server 210 performs the operation of receiving radio timer information corresponding to data transmission of part of a data stream from a base station to a user equipment. The receiving occurs at a content server performing streaming of data of which the data transmission is a part. The content server, in block 1220, performs the operation of adapting, based on the received radio timer information, streaming strategy for the streaming the data stream toward the base station for transmission by the base station to the user equipment. In block 1230, the content server 210 performs the operation of streaming the data stream toward the base station based on the adapted streaming strategy.

A further example is the method of FIG. 12, wherein adapting streaming strategy further comprises performing one or both of transmission control protocol congestion window changes or adaptive transmission control protocol pacing and streaming further comprises streaming the data stream according to the performed one or both of transmission control protocol congestion window changes or performing adaptive transmission control protocol pacing. Another example is the method of this paragraph, wherein performing adaptive transmission control protocol pacing further comprises disabling fixed time-based pacing of packets and using adaptable pacing of packets, wherein the packets are used to carry portions of the data stream.

Another example is a method as in FIG. 12 and the paragraphs referencing FIG. 12, further comprising receiving information regarding quality of experience at the user equipment of data presentation of a portion of the data stream to a user application at the user equipment and information regarding energy consumption by the user equipment caused at least by the data presentation of the portion of the data stream to the user application, and preparing one or more reports comprising one or both of quality of experience and energy consumption corresponding to the received quality of experience and the energy consumption, and sending the one or more reports toward a radio network node. The method of this paragraph, wherein preparing comprises inserting the one or more reports into the data stream and sending further comprises sending the data stream including the one or more reports toward the radio network node.

Another example is a method as in FIG. 12 and the paragraphs referencing FIG. 12, wherein data in the data stream comprises video and wherein the streaming strategy comprises adapting video streaming strategy for streaming the video toward the base station based on the received radio timer information.

Another example is a method as in FIG. 12 and the paragraphs referencing FIG. 12, wherein the radio timer information comprises one or more of the following: a minimum time that the user equipment will be powered and consume energy in a dedicated state; a time that the user equipment will still be powered, even if there is no activity seen towards the user equipment; a time that the user equipment could be parked immediately to an intermediate state; and a time interval in which the content server and the user equipment should exchange all data. A further example is the method of this paragraph, wherein the radio timer information is sent as part of a message and wherein the message further comprises an available bandwidth that the content server or user equipment could use for a time quantum proposed so as to realize satisfactory quality of experience for data presentation to the user application on the user equipment.

An example of an apparatus includes one or more processors and one or more memories including computer program code. The one or more memories and the computer program code are configured to, with the one or more processors, cause the apparatus to perform a method as in FIG. 12 and any paragraphs referencing FIG. 12. Another example of an embodiment is an apparatus comprising means for performing a method as in FIG. 12 and any paragraphs referencing FIG. 12.

In an additional example of an embodiment, a system comprises any of the apparatus of the above that refer to any of FIGS. 9-12.

An additional example of an embodiment includes a computer program, comprising code for performing any of the methods of FIGS. 9-12 or any paragraphs referring to FIGS. 9-12, when the computer program is run on a processor. The computer program according to this paragraph, wherein the computer program is a computer program product comprising a computer-readable medium bearing computer program code embodied therein for use with a computer.

The examples of the embodiments herein have one or more of the following examples of advantages and technical effects:

- A mechanism to export the radio network configuration as time quantum to deliver burst intervals;
- A mechanism to combine guidance information along with the radio configuration time quantum to perform adaptive pacing of packets from the content server;
- A mechanism as a feedback to receive power and other QoE information from the content server;
- A mechanism to learn and report effective utilization of guidance information;
- A mechanism wherein any feedback message that is exchanged between client and server is to be piggybacked or sent during the video data transfer or immediately after the video data in a transfer, as this will reduce the network occupancy time of the UE and improve the scheduling;

A mechanism wherein the UE battery value can be used as constructive input both by eNodeB (e.g., to perform power aware scheduling) and by remote content server (e.g., to schedule data to eNodeB);

A concept of probe-less architecture is a key requirement for the Telco cloud, and the above examples of solutions may entail tight integration for operator, application service provider, and network vendor and be based on probe-less architecture.

The various controllers/data processors, memories, programs, transceivers and antenna arrays depicted in FIG. 1 may all be considered to represent means for performing operations and functions that implement the several non-limiting aspects and embodiments of this invention.

At least some embodiments herein may be implemented in software (executed by one or more processors), hardware (e.g., an application specific integrated circuit), or a combination of software and hardware. In an example of an embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 155, 171 or other device) that may be any media or means that can contain or store the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The following abbreviations that may be found in the specification and/or the drawings.

ABR adaptive bit rate
ACK acknowledge
ASP application service provider
AVP adaptive video pacing
CPC continuous packet connectivity
CS content server
DRX discontinuous reception
DTX discontinuous transmission
EC energy consumption
eNB or eNodeB evolved NodeB (e.g., an LTE base station)
EPC evolved packet core
HE header enrichment
HTTP hypertext transfer protocol
ICMP Internet control message protocol
IP Internet protocol
IPV6 IP version 6
JIT just in time
KB kilobytes
LTE long term evolution
LTE-A LTE-advanced
MEC mobile edge computing
N/W network
OMI operator-management-interface
OS operating system
QoE quality of experience
RACS radio access cloud server
RAN radio access network
Rx reception or receiver
SSL secure sockets layer
TCP transmission control protocol
TG throughput guidance
Tx transmission or transmitter
UE user equipment (e.g., a wireless device)

What is claimed is:

1. A method, comprising:
   receiving, at a radio network element, radio timer information corresponding to data transmission of part of a data stream from a base station to a user equipment;
   inserting the radio timer information into data traffic information to be sent from the radio network element to a content server serving and adapting the data stream, wherein the data traffic information corresponds to and is in response to reception of the data stream;
   sending the data traffic information including the inserted radio timer information from the radio network element to the content server; and
   receiving, from the content server, data traffic comprising data from the data stream for presentation to a user application and one or more reports comprising one or both of quality of experience and energy consumption, and forwarding the data but not the one or more reports from the radio network element to the user equipment.

2. The method of claim 1, wherein the radio timer information comprises one or more of the following:
   a minimum time that the user equipment will be powered and consume energy in a dedicated state;
   a time that the user equipment will still be powered, even if there is no activity seen towards the user equipment;
   a time that the user equipment could be parked immediately to an intermediate state; and
   a time interval in which the content server and the user equipment should exchange all data.

3. The method of claim 2, wherein the radio timer information is sent as part of a message and wherein the message further comprises an available bandwidth that the content server or user equipment could use for a time quantum proposed so as to realize satisfactory quality of experience for data presentation to the user application on the user equipment.

4. The method of claim 1, wherein inserting further comprises inserting the radio timer information into transmission control protocol header extensions for packets carrying at least some of the data traffic information.

5. The method of claim 1, further comprising receiving one or more reports comprising one or both of the quality of experience and the energy consumption from the content server, wherein the quality of experience and the energy consumption concerns data presentation of part of the data stream to a user application by the user equipment for the part of the data stream sent to the user equipment from the content server, and using the received one or both of quality of experience and energy consumption to perform one or both of power aware scheduling of subsequent data transmissions of data for the data stream to the user equipment and radio timer adjustments for the data transmissions to the user equipment.

6. The method of claim 1, wherein the radio network element is one of the following: a part of a base station or a separate entity from the base station.

7. The method of claim 1, wherein the data stream comprises video.

8. A method, comprising:
receiving radio timer information corresponding to data transmission of part of a data stream from a base station to a user equipment, the receiving occurring at a content server performing streaming of data of which the data transmission is a part;
adapting, based on the received radio timer information, streaming strategy for the streaming the data stream toward the base station for transmission by the base station to the user equipment, wherein adapting streaming strategy further comprises performing one or both of transmission control protocol congestion window changes or adaptive transmission control protocol pacing and streaming further comprises streaming the data stream according to the performed one or both of transmission control protocol congestion window changes or performing adaptive transmission control protocol pacing, and wherein performing adaptive transmission control protocol pacing further comprises disabling fixed time-based pacing of packets and using adaptable pacing of packets, wherein the packets are used to carry portions of the data stream; and
streaming the data stream toward the base station based on the adapted streaming strategy.

9. The method of claim 8, further comprising receiving information regarding quality of experience at the user equipment of data presentation of a portion of the data stream to a user application at the user equipment and information regarding energy consumption by the user equipment caused at least by the data presentation of the portion of the data stream to the user application, and preparing one or more reports comprising one or both of quality of experience and energy consumption corresponding to the received quality of experience and the energy consumption, and sending the one or more reports toward a radio network node.

10. A method, comprising:
receiving radio timer information corresponding to data transmission of part of a data stream from a base station to a user equipment, the receiving occurring at a content server performing streaming of data of which the data transmission is a part;
adapting, based on the received radio timer information, streaming strategy for the streaming the data stream toward the base station for transmission by the base station to the user equipment;
streaming the data stream toward the base station based on the adapted streaming strategy;
receiving information regarding quality of experience at the user equipment of data presentation of a portion of the data stream to a user application at the user equipment and information regarding energy consumption by the user equipment caused at least by the data presentation of the portion of the data stream to the user application;
preparing one or more reports comprising one or both of quality of experience and energy consumption corresponding to the received quality of experience and the energy consumption, wherein preparing comprises inserting the one or more reports into the data stream; and
sending the one or more reports toward a radio network node, wherein sending further comprises sending the data stream including the one or more reports toward the radio network node.

11. An apparatus, comprising:
one or more processors; and
one or more memories including computer program code, wherein the one or more memories and the computer program code are configured to, with the one or more processors, cause the apparatus to perform at least the following:
receiving, at a radio network element, radio timer information corresponding to data transmission of part of a data stream from a base station to a user equipment;
inserting the radio timer information into data traffic information to be sent from the radio network element to a content server serving and adapting the data stream, wherein the data traffic information corresponds to and is in response to reception of the data stream;
sending the data traffic information including the inserted radio timer information from the radio network element to the content server; and
receiving, from the content server, data traffic comprising data from the data stream for presentation to a user application and one or more reports comprising one or both of quality of experience and energy consumption, and forwarding the data but not the one or more reports from the radio network element to the user equipment.

12. An apparatus, comprising:
one or more processors; and
one or more memories including computer program code, wherein the one or more memories and the computer program code are configured to, with the one or more processors, cause the apparatus to perform at least the following:
receiving radio timer information corresponding to data transmission of part of a data stream from a base station to a user equipment, the receiving occurring at a content server performing streaming of data of which the data transmission is a part;
adapting, based on the received radio timer information, streaming strategy for the streaming the data stream toward the base station for transmission by the base station to the user equipment, wherein adapting streaming strategy further comprises performing one or both of transmission control protocol congestion window changes or adaptive transmission control protocol pacing and streaming further comprises streaming the data stream according to the performed one or both of transmission control protocol congestion window changes or performing adaptive transmission control protocol pacing, and wherein performing adaptive transmission control protocol pacing further comprises disabling fixed time-based pacing of packets and using adaptable pacing of packets, wherein the packets are used to carry portions of the data stream; and streaming the data stream toward the base station based on the adapted streaming strategy.

13. An apparatus, comprising:

one or more processors; and one or more memories including computer program code, wherein the one or more memories and the computer program code are configured to, with the one or more processors, cause the apparatus to perform at least the following:

receiving radio timer information corresponding to data transmission of part of a data stream from a base station to a user equipment, the receiving occurring at a content server performing streaming of data of which the data transmission is a part;

adapting, based on the received radio timer information, streaming strategy for the streaming the data stream toward the base station for transmission by the base station to the user equipment;

streaming the data stream toward the base station based on the adapted streaming strategy;

receiving information regarding quality of experience at the user equipment of data presentation of a portion of the data stream to a user application at the user equipment and information regarding energy consumption by the user equipment caused at least by the data presentation of the portion of the data stream to the user application;

preparing one or more reports comprising one or both of quality of experience and energy consumption corresponding to the received quality of experience and the energy consumption, wherein preparing comprises inserting the one or more reports into the data stream; and sending the one or more reports toward a radio network node, wherein sending further comprises sending the data stream including the one or more reports toward the radio network node.

14. A computer program product comprising a non-transitory computer-readable storage medium bearing computer program code embodied therein for use with an apparatus, the computer program code comprising code for causing the apparatus to perform the method of claim 1.

15. A computer program product comprising a non-transitory computer-readable storage medium bearing computer program code embodied therein for use with an apparatus, the computer program code comprising code for causing the apparatus to perform the method of claim 8.

16. A computer program product comprising a non-transitory computer-readable storage medium bearing computer program code embodied therein for use with an apparatus, the computer program code comprising code for causing the apparatus to perform the method of claim 10.

* * * * *